United States Patent
Rijskamp et al.

(10) Patent No.: US 8,186,264 B2
(45) Date of Patent: May 29, 2012

(54) DISPOSABLE CARTRIDGE FOR USE IN A BEVERAGE MAKER, COMPRISING A NOVABLY ARRANGED NEEDLE MEMBER

(75) Inventors: Peter Rijskamp, Hoogeveen (NL); Frans Rozeboom, Haren (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 731 days.

(21) Appl. No.: 12/300,541

(22) PCT Filed: May 10, 2007

(86) PCT No.: PCT/IB2007/051768
§ 371 (c)(1),
(2), (4) Date: Nov. 12, 2008

(87) PCT Pub. No.: WO2007/132409
PCT Pub. Date: Nov. 22, 2007

(65) Prior Publication Data
US 2009/0110775 A1    Apr. 30, 2009

(30) Foreign Application Priority Data
May 17, 2006 (EP) .................................. 06114066

(51) Int. Cl.
*B65B 29/06* (2006.01)
*A47J 31/06* (2006.01)
(52) U.S. Cl. ............... 99/295; 426/77; 426/115; 99/323
(58) Field of Classification Search ............. 426/77, 426/78, 82, 112, 115; 99/295, 323
See application file for complete search history.

(56) References Cited

U.S. PATENT DOCUMENTS

| | | | | |
|---|---|---|---|---|
| 3,610,132 A * | 10/1971 | Martin | .......................... | 99/295 |
| 3,985,069 A * | 10/1976 | Cavalluzzi | .................... | 99/295 |
| 6,948,420 B2 * | 9/2005 | Kirschner et al. | ............ | 99/295 |
| 2004/0115317 A1 * | 6/2004 | Doglioni | ...................... | 426/123 |
| 2004/0228955 A1 * | 11/2004 | Denisart et al. | ............... | 426/590 |

FOREIGN PATENT DOCUMENTS

| | | |
|---|---|---|
| BE | 1015694 A6 | 7/2005 |
| DE | 2327264 A1 | 1/1975 |
| DE | 8708532 U1 | 1/1988 |
| EP | 1580143 A1 | 9/2005 |
| GB | 1256247 A | 12/1971 |
| WO | 02081337 A1 | 10/2002 |
| WO | WO 02076270 A1 * | 10/2002 |
| WO | WO 2005092160 A1 * | 10/2005 |

* cited by examiner

*Primary Examiner* — Viren Thakur

(57) ABSTRACT

A disposable cartridge (1) for use in a beverage maker comprises a container (10) for containing at least one beverage ingredient and a connector (20) for establishing a connection between the cartridge (1) and a beverage maker. The connector (20) comprises a hollow needle member (22) having a blunt end (23) for piercing a portion (11) of a wall (12) of the container (10), wherein the needle member (22) extends inside a dome-shaped portion (13) of the container wall (12). Furthermore, the connector (20) is movably arranged with respect to the container (10). During operation, an impacting force is exerted on the needle member (22), as a result of which the connector (20) is moved with respect to the container (10), in a direction towards the container (10), and the pierceable portion (11) of the container wall (12) is pierced by the end (23) of the needle member (22). After the piercing process has taken place, the content of the container (10) is retrievable through the needle member (22).

12 Claims, 2 Drawing Sheets

DISPOSABLE CARTRIDGE FOR USE IN A BEVERAGE MAKER, COMPRISING A NOVABLY ARRANGED NEEDLE MEMBER

The present invention relates to a disposable cartridge for use in a beverage maker, comprising a container for containing at least one beverage ingredient. In particular, the present invention relates to a disposable cartridge in which a portion of the container wall is intended to be pierced, for example by a needle or the like, in order to open the container, so that its content may be retrieved and used in a process of making a beverage.

Among other things, a cartridge having a pierceable container wall portion has the advantage that the container may remain completely closed until a need for retrieving its content arises, as a result of which there is no risk of beverage ingredients leaking from the cartridge during handling of the cartridge. Furthermore, a process of a decrease of quality of the content of the container only takes place at a rate which is as low as possible, as external influences are minimized.

Disposable cartridges such as mentioned in the preceding paragraph are known in practice. For example, a portion of the container wall may be constituted by a relatively thin foil. According to the state of the art, a beverage maker which is used for receiving and operating the cartridges comprises a hollow needle member for piercing the foil and sucking up the beverage ingredient(s) from the container. In order to have successful piercing actions, an end of the needle member has a sharp geometry. Furthermore, the needle member is usually made of glass filled plastics or metal.

A problem that is associated with the state of the art is that the needle member of the beverage maker gets contaminated by the beverage ingredient(s). It is an objective of the present invention to solve this problem. This objective is achieved by a disposable cartridge for use in a beverage maker, comprising a container for containing at least one beverage ingredient, and a needle member for piercing a portion of a wall of the container, wherein the needle member and the pierceable portion of the container wall are movably arranged with respect to each other.

According to the present invention, the disposable cartridge comprises a needle member, so that it is not necessary for the beverage maker to have a needle member. Consequently, contamination of the needle member is not an issue, as the needle member is part of the cartridge which is thrown away after use.

In principle, it is not a favorable option to let the needle member be part of the disposable cartridge, as the cost of the cartridge should be as low as possible. Due to the fact that it is not easy to get a piece having a sharp geometry in cheap plastics, the state of the art offers only solutions in which the beverage maker comprises the needle member. However, according to an insight underlying the present invention, it is possible to apply a needle member having a blunt end, namely when piercing of the pierceable container wall portion is done with impact, i.e. under the influence of a predetermined force which is suddenly released.

When piercing is done with impact, the geometry of the needle member is less critical, and the end of the needle member which is adapted to penetrate through the pierceable container wall portion does not need to be sharp. Furthermore, the pierce force may be lower than the pierce force which is needed for the purpose of performing a conventional piercing process, so that there is little or no deformation of the needle member. Consequently, it is possible that the needle member comprises another material than conventional material such as reinforced plastics or metal, for example polypropylene. This is very advantageous in the case of a needle member which is part of a disposable cartridge.

When a piercing process is performed in a conventional way, i.e. by pushing a needle member through a foil of the container, the pierce force and stroke of the needle member are determined by the thickness and the composition of the foil, as well as by the geometry of the needle member. Especially when a long shelf life is required for the beverage ingredient(s), the material of the container is made of a composite having a tough layer on the inside, which layer may comprise polyethylene, for example. It is quite difficult to break such a layer, and therefore, in the conventional way of piercing, a high pierce force, a large stroke and a sharp needle member are required. When the piercing is done with impact, which is the case when the present invention is applied, these disadvantages are overcome. According to a feasible possibility, piercing under the influence of an impacting force involves releasing a certain force at once onto the needle member. In so doing, it may be achieved that the pierce force is lower, even up to four times, and that the stroke of the needle member may be smaller, up to two or even three times. Furthermore, a well-defined opening may be obtained in the container wall, as a result of which the inlet resistance is well-defined, and a needle member having a blunt end for penetrating through the pierceable container wall portion may be used. One of the advantages of using a blunt needle member is that premature opening of the container is avoided. Another one of the advantages of using a blunt needle member is that the needle member may be made of plastic. In this way, it is achieved that the entire cartridge may be made of plastic, on the basis of which manufacturing costs may be kept low.

In the disposable cartridge according to the present invention, the needle member does not necessarily need to be hollow. It is also possible that the needle member is only used for piercing a portion of the container wall, and that the content of the container is transported further in another way than through the needle member. However, using the needle member for transporting at least one beverage ingredient from the container towards an outlet of the cartridge is a preferred option, due to the fact that letting the needle member perform two important functions, namely opening the container and retrieving and transporting its content, contributes to a compact design of the disposable cartridge.

According to a practical possibility, the needle member is part of a connector of the disposable cartridge, which serves for establishing a connection between the cartridge and a beverage maker. In a preferred embodiment of the disposable cartridge according to the present invention, the entire container and the entire connector are movably arranged with respect to each other. In this way, a simple, reliable and robust construction of the cartridge is obtained.

It is noted that both the container and the connector of the cartridge may be of any suitable type, and may have any suitable shape. For example, the connector may comprise a duct system which acts like a fluid pump during operation, and which plays a role in providing a sucking force which is needed for the purpose of sucking up the content of the container through the needle member. Furthermore, the disposable cartridge may have many features which are applicable to conventional cartridges as well, provided that these features do not conflict with the present invention or hinder the functioning of the present invention. For example, the disposable cartridge may be provided with a recognition code, on the basis of which the functioning of a beverage maker which is used for receiving and operating the cartridge is determined.

In order to avoid loss of energy during the process of piercing with impact, it is important that the pierceable container wall portion is well-supported. Therefore, in a preferred embodiment of the disposable cartridge according to the present invention, the pierceable container wall portion is supported by support means resting on a supporting portion of the container. In a particular embodiment, the container wall may have a dome-shaped portion, wherein the needle member is extending inside this dome-shaped container wall portion, and wherein the pierceable container wall portion is present at an end of this dome-shaped container wall portion. In that case, support of the pierceable container wall portion may be provided by letting the dome-shaped container wall portion rest on a supporting portion of the container, through support means arranged at the end of the dome-shaped container wall portion. These support means may comprise an array of interspaced ribs surrounding the pierceable container wall portion, for example. The spaces between the support ribs allow for a flow of beverage ingredient(s) from the container to the needle member when an opening has been made in the container wall.

The present invention also relates to a method for operating the disposable cartridge according to the present invention. In particular, this method involves realizing an impact of the needle member on the pierceable container wall portion by allowing a predetermined force to act on the needle member at once. Preferably, in case the needle member is part of a connector of the disposable cartridge, the entire connector is moved with respect to the entire container under the influence of the impacting force, so that a well-defined relative movement of the needle member and the pierceable container wall portion is obtained.

The present invention also relates to a beverage maker which is adapted to receive and operate the disposable cartridge according to the present invention. Such a beverage maker comprises means for exerting an impacting force on the needle member of the cartridge, which means may comprise a releasably arranged piston, for example.

The present invention will now be explained in greater detail with reference to the figures, in which equal or similar parts are indicated by the same reference signs, and in which.

Figure 1:
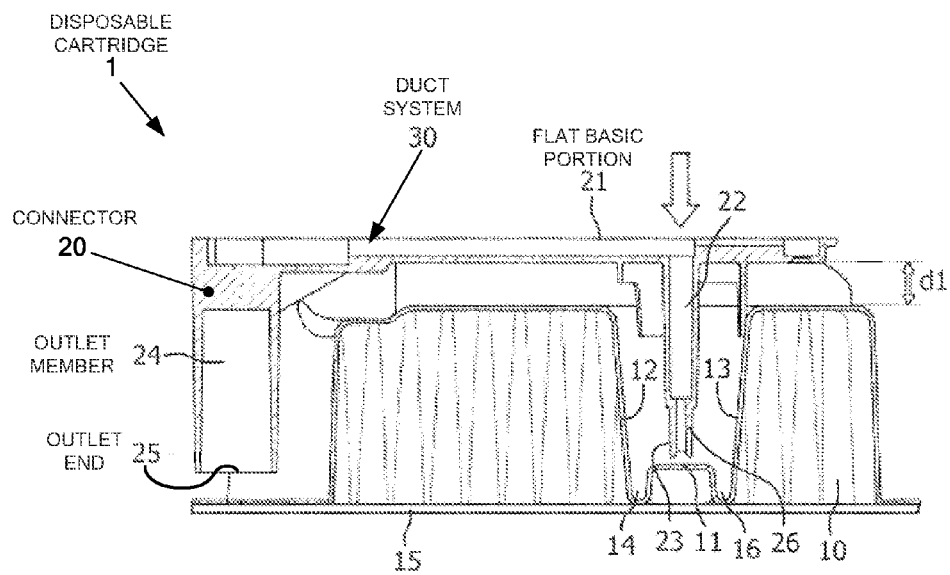
FIG. 1 is a side view of a cross-section through a disposable cartridge according to the present invention, wherein the cartridge is shown in a non-operative condition, i.e. in a condition in which a container of the cartridge is closed.
Figure 2:
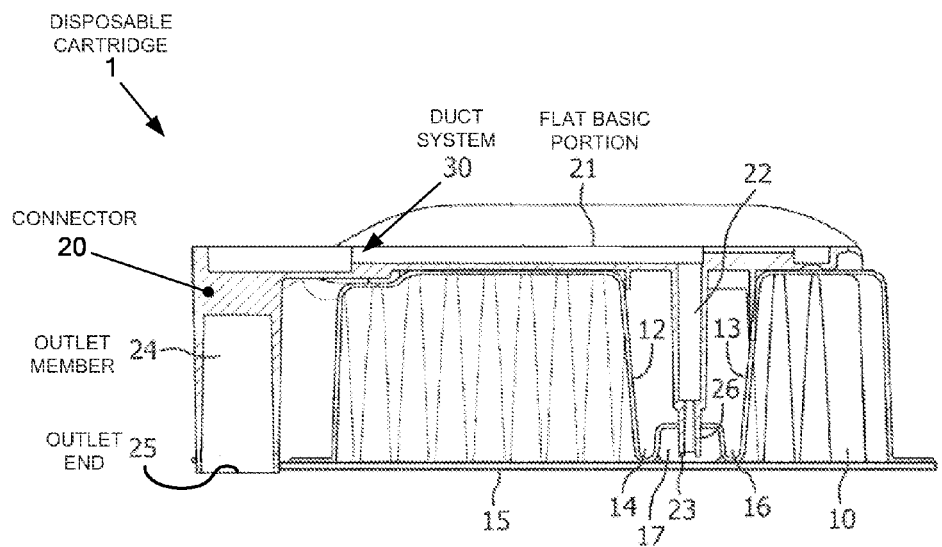
FIG. 2 is a side view of a cross-section through a disposable cartridge according to the present invention, wherein the cartridge is shown in an operative condition, i.e. in a condition in which a container of the cartridge is opened.

In FIGS. 1 and 2, a cross-section through a disposable cartridge 1 according to the present invention is shown. The disposable cartridge 1 is intended to be inserted in a beverage maker (not shown), and serves for supplying one or more beverage ingredients.

The disposable cartridge 1 comprises two parts which are movably arranged with respect to each other, namely a container 10 which is filled with one or more beverage ingredients, and a connector 20 which serves for connecting the cartridge to the beverage maker. In the following, for sake of clarity of the description, it is assumed that the cartridge 1 is used in an orientation such as shown in FIGS. 1 and 2, i.e. an orientation in which the connector 20 is situated at the top of the cartridge 1. That does not alter the fact that within the scope of the invention, it is also possible that the cartridge 1 is used in another suitable orientation. Furthermore, in the following, it is assumed that the container 10 of the cartridge 1 contains milk. That does not alter the fact that within the scope of the present invention, the container 10 may comprise another fluid or a mixture of fluids.

The connector 20 comprises a flat basic portion 21 and a hollow needle member 22 extending from the basic portion 21, in a downward direction, wherein a longitudinal axis of the needle member 22 is substantially at right angles to a plane in which the basic portion 21 is extending. An end 23 of the needle member 22 is adapted to penetrate through a pierceable portion 11 of a wall 12 of the container 10, and the needle member 22 in its entirety serves for transporting milk from the container 10 to a duct system 30 which is present in the basic portion 21. Preferably, the duct system 30 is suitable for pumping the milk under the influence of an underpressure, but this is not necessary within the scope of the present invention.

Besides the basic portion 21 and the needle member 22, the connector 20 also comprises an outlet member 24 having an outlet end 25. During operation, the milk flows from the container 10 to the duct system 30 in the basic portion 21 of the connector 20, through the needle member 22, is transported by the duct system 30 to the outlet member 24, and exits the cartridge 1 through the outlet opening 25 of the outlet member 24.

Figure 3:
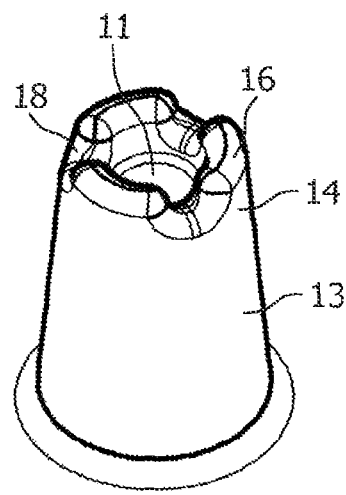
FIG. 3 is a diagrammatical perspective view of a dome-shaped portion of a wall of a container of the disposable cartridge in the non-operative condition.

The pierceable portion 11 of the container wall 12 is part of a dome-shaped portion 13 of the container wall 12, which, for sake of simplicity, will hereinafter be referred to as dome 13. In the shown example, the dome 13 has a circular cross-section and tapers in a direction from a top of the container 10 to a bottom of the container 10. This can also be seen in FIG. 3, in which the dome 13 is separately shown. At the top of the container 10, the dome 13 is open, and a considerable portion of the needle member 22 is extending inside the dome 13. The pierceable portion 11 is positioned at a closed end 14 of the dome 13, which is present at the bottom of the container 10. The dome 13 rests on a bottom member 15 of the container 10, through interspaced support ribs 16, which are formed as local extensions of the dome 13 at a position beyond the pierceable portion 11, i.e. at a level lower than the level of the pierceable portion 11. In the shown example, the number of support ribs 16 is three, but this is not an essential feature of the cartridge 1 according to the present invention. Furthermore, in the shown example, the support ribs 16 have a round appearance.

In the following, the operation of the cartridge 1 according to the present invention will be explained.

In the first place, the cartridge 1 is positioned in a beverage maker (not shown) which has a space for receiving and accommodating the cartridge 1. When the cartridge 1 is in the proper position in the beverage maker, a connection of the cartridge 1 to the beverage maker is established by the connector 20. In particular, the duct system 30 of the connector 20 is connected to a duct (not shown) or a duct system (not shown) of the beverage maker, for example a duct for supplying steam for the purpose of both heating and pumping the milk.

Initially, the cartridge 1 is placed in the beverage maker in the condition as shown in FIG. 1, i.e. the condition in which the entire needle member 22 is above the pierceable portion 11 of the container wall 12, wherein the end 23 of the needle member 22 is closest to the pierceable portion 11.

All of a sudden, the connector 20 is struck by means (not shown) of the beverage maker, in such a way that the connector 20 is moved in the direction of the container 10. For example, the beverage maker may comprise a piston (not shown) which is suddenly released, and which is arranged such as to impact on the connector 20 at the position of the needle member 22. In FIG. 1, this impact is represented by a downwardly directed arrow.

As a result of the impact, the connector 20 is moved along a distance d1, which is indicated in FIG. 1 by a double-headed arrow. In the process, the end 23 of the needle member 22 penetrates through the pierceable portion 11 of the container wall 12. The distance d1 along which the connector 20 is moved, may also be regarded as a stroke of the needle member 22. In FIG. 2, the cartridge 1 is shown in the condition in which the pierceable portion 11 of the container wall 12 is pierced by the needle member 22, wherein an end portion 26 of the needle member 22 is extending inside a room 17 between the bottom member 15 of the container 10, an unbroken portion of the pierceable portion 11 and the support ribs 16. The milk can enter this room 17 through spaces 18 between the support ribs 16. For the purpose of allowing for a flow of milk into the needle member 22, the needle member 22 is positioned in such a way that its end 23 is at a small distance above the bottom member 15 of the container 10. Nevertheless, within the scope of the present invention, the design of the end 23 of the needle member 22 may be such that a flow of milk into the needle member 22 may also take place when this end 23 is in contact with the bottom member 15 of the container 10. For example, a ring-shaped end surface of the needle member 22 does not necessarily need to be planar, but may have a ridged appearance.

Figure 4:
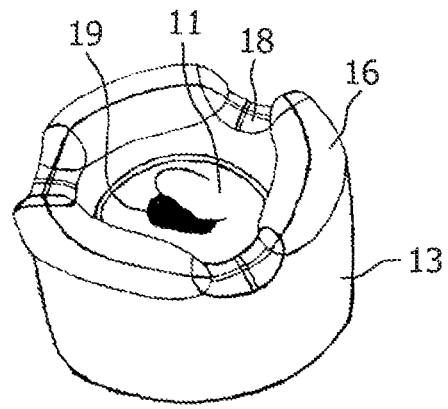
FIG. 4 is a diagrammatical perspective view of a dome-shaped portion of a wall of a container of the disposable cartridge in the operative condition.

The needle member 22 is preferably made of the same material as the other components of the cartridge 1, which material is usually a rather cheap plastic, in view of the fact that the cartridge 1 is to be applied as a disposable, which is suitable to be used only one time or a limited number of times in a process of preparing a beverage. Furthermore, the end 23 of the needle member 22 is blunt, as it is easier to manufacture a blunt geometry than a sharp geometry, and there is no need for a sharp geometry, due to the fact that the needle member 22 is subjected to an impacting force for the purpose of piercing the pierceable portion 11 of the container wall 12. The effect of the piercing process is illustrated by FIG. 4, in which a portion of the dome 13 is shown. It can be seen that a relatively large opening 19 is obtained in the pierceable portion 11 of the container wall 12. The size of this opening 19 is mainly determined by the size (diameter) of the end portion 26 of the needle member 22.

The impacting force that is used in the process of creating the opening 19 in the pierceable portion 11 of the container wall 12 may be considerably lower than the force that is needed in a conventional process of creating an opening by driving a needle member having a sharp end through a pierceable portion 11 of the container wall 12. This is an important advantage of the present invention.

Figure 5:
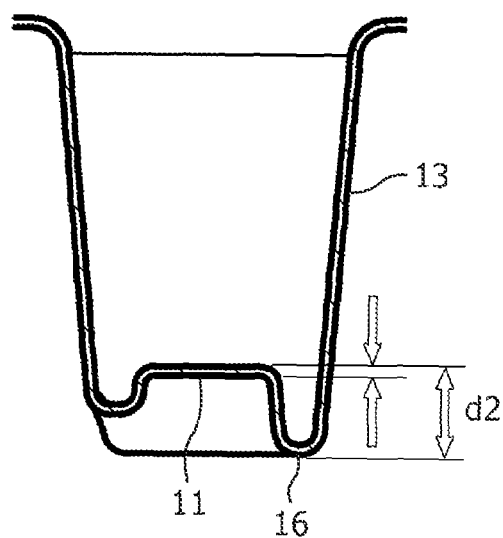
FIG. 5 is a side view of a longitudinal section through a dome-shaped portion of a wall of a container of the disposable cartridge in the non-operative condition.

By means of the support ribs 16, the dome 13 is well-supported. In this way, successful piercing of the pierceable portion 11 of the container wall 12 is guaranteed, as loss of energy due to deformations and/or movements of the dome 13 is minimized. The success of the piercing process is also dependent on the thickness of the pierceable portion 11 of the container wall 12. When the container 10 is manufactured by a process which is known as thermoforming, it is very well possible to control the thickness of the pierceable portion 11 of the container wall 12, namely by controlling a distance d2 between the tops of the support ribs 16 and the pierceable portion 11, which, for sake of simplicity, will hereinafter be referred to as depth d2 of the dome 13. In FIG. 5, this depth d2 of the dome 13 is indicated by a double-headed arrow, whereas the thickness of the pierceable portion 11 of the container wall 12 is represented as a distance between two opposite arrows. In general, the relation between the depth d2 of the dome 13 and the thickness of the pierceable portion 11 of the container wall 12 is such that an increase of the depth d2 of the dome 13 leads to a decrease of the thickness of the pierceable portion 11. On the basis of this relation, in case there is a need of manufacturing a container 10 having a relatively small height, it is possible to use a relatively thin basic foil, and to avoid the occurrence of dangerously thin portions in the container wall 12 by choosing an appropriate value of the depth d2 of the dome 13, i.e. a value which is relatively low.

In the following table, a summary is given of measurement results which are obtained in two different processes of piercing the pierceable portion 11 of the container wall 12, namely a process according to the present invention, in which a needle member 22 having a blunt end 23 is used, and in which the needle member 22 is subjected to an impacting force and is moved along a fixed stroke, and a conventional process in which a needle member having a sharp end is used, and in which the needle member is subjected to a pushing force for pushing the end of the needle member against the pierceable portion 11. The results are obtained by using identical domes 13 which were both made of a 0.8 mm thick foil composed of 680 μm Polystyrene (PS), 40 μm Ethylene vinyl alcohol (EVOH) and 50 μm Polyethylene (PE), under the influence of a thermoforming process, in which a thickness of the pierceable portion 11 of the container wall 12 of approximately 0.25 mm had been obtained.

|  | Measurement results | |
| --- | --- | --- |
|  | Process according to the present invention | Conventional process |
| Stroke (mm) | fixed stroke of 4.3 | 10-15 |
| Average forces during stroke (N) | 19.9 | 79.5 |
| Needle tip geometry | Blunt | 30° |

It follows from a comparison of the results that in the piercing process according to the present invention, both the stroke of the needle member 22 and the forces exerted during the stroke are considerably lower than in the conventional piercing process. What's more, the conventional piercing process did not lead to the creation of an opening in the pierceable portion 11 of the container wall 12, but only to a deformation of this portion 11, whereas the piercing process according to the present invention resulted in the creation of an opening 19 as shown in FIG. 4.

It will be clear to a person skilled in the art that the scope of the present invention is not limited to the examples discussed in the foregoing, but that several amendments and modifications thereof are possible without deviating from the scope of the present invention as defined in the attached claims.

The shown cartridge 1 comprises only one container 10. However, it is also possible for a cartridge according to the present invention to comprise two or even more containers 10, depending on the number of fluids which are to be supplied by the cartridge in a process of making a beverage. In such a case, it is preferred if the cartridge comprises a number of needle members 22, wherein each of the needle members 22 is associated with another container 10.

In the shown cartridge 1, a portion 11 of the container wall 12 is pierceable. Within the scope of the present invention, it is also possible that a pierceable foil or the like is inserted in the container wall 12. However, it is preferred when the pierceable portion 11 of the container wall 12 is simply constituted by a relatively thin portion 11 of the container wall 12, as in that case, there is no need for a separate member to be arranged in the container wall 12.

In the foregoing, a disposable cartridge 1 for use in a beverage maker has been described. In a feasible embodiment, the cartridge 1 comprises a container 10 for containing at least one beverage ingredient and a connector 20 for establishing a connection between the cartridge 1 and a beverage maker. The connector 20 comprises a hollow needle member 22 having a blunt end 23 for piercing a portion 11 of a wall 12 of the container 10, wherein the needle member 22 extends inside a dome-shaped portion 13 of the container wall 12. Furthermore, the connector 20 is movably arranged with respect to the container 10. During operation, an impacting force is exerted on the needle member 22, as a result of which the connector 20 is moved with respect to the container 10, in a direction towards the container 10, and the pierceable portion 11 of the container wall 12 is pierced by the end 23 of the needle member 22. After the piercing process has taken place, the content of the container 10 is retrievable through the needle member 22.

The invention claimed is:

1. Disposable cartridge for use in a beverage maker comprising:
   a container for containing at least one beverage ingredient, and
   a connector, positioned above the container, for establishing a connection between the disposable cartridge and a beverage maker, wherein the connector comprises (i) a flat basic portion and (ii) a needle member extending, in a downward direction toward the container, from the basic portion, the needle member for piercing a portion of a wall of the container, wherein the needle member and the pierceable portion of the container wall are movably arranged with respect to each other.

2. Disposable cartridge according to claim 1, wherein at least one of the needle member and the pierceable portion of the container wall is adapted to be moved under the influence of an impacting force.

3. Disposable cartridge according to claim 1, wherein the needle member is adapted to transport at least one beverage ingredient from the container towards an outlet of the cartridge.

4. Disposable cartridge according to claim 3, wherein the needle member is hollow.

5. Disposable cartridge according to claim 1, wherein an end of the needle member, which is adapted to penetrate through the pierceable portion of the container wall, comprises a blunt end to avoid premature opening of the container.

6. Disposable cartridge according to claim 1, wherein both the container and the needle member are made of plastic.

7. Disposable cartridge according to claim 1, wherein the entire container and the entire connector are movably arranged with respect to each other.

8. Disposable cartridge according to claim 1, wherein the pierceable portion of the container wall is supported by support means resting on a supporting portion of the container.

9. Disposable cartridge according to claim 8, wherein the needle member is extending inside a dome-shaped portion of the container wall, wherein the pierceable portion of the container wall is present at an end of the dome-shaped portion of the container wall, wherein the dome-shaped portion rests on shaped portion rest on the supporting portion of the container, through support means arranged at the end of the dome-shaped portion of the container wall.

10. Disposable cartridge according to claim 9, wherein the support means comprise an array of interspaced ribs surrounding the pierceable portion of the container wall.

11. Disposable cartridge according to claim 1, wherein the container comprises a wall comprising a dome-shaped portion.

12. Disposable cartridge according to claim 1, wherein the connector comprises a needle member having an end which is adapted to penetrate through a pierceable portion of a wall of another component of the cartridge.

* * * * *